Patented Sept. 10, 1940

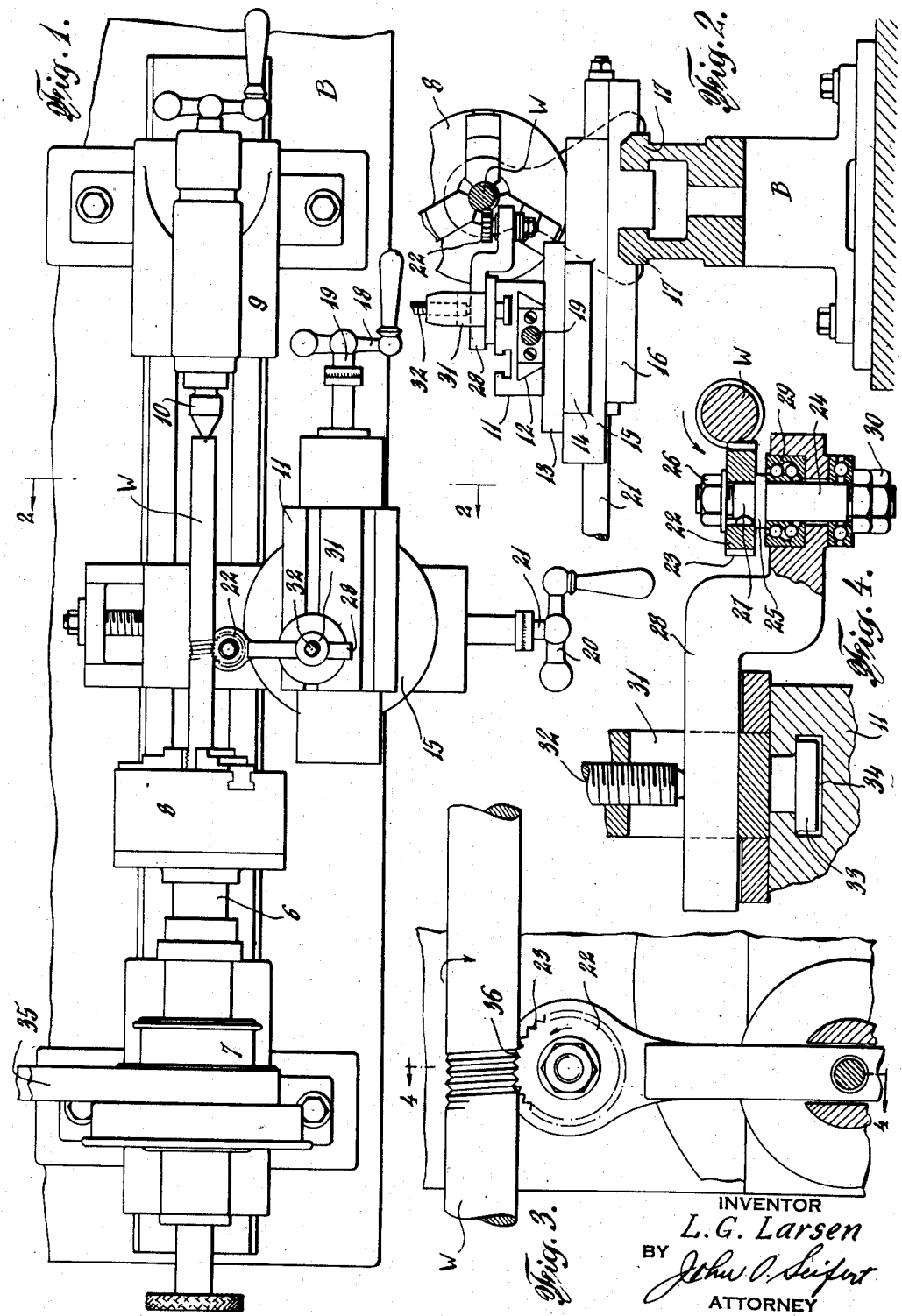

2,214,058

UNITED STATES PATENT OFFICE 2,214,058

THREAD CUTTING MEANS

Louis G. Larsen, Jersey City, N. J., assignor of one-half to Herman Neuwirth and one-half to Benjamin E. Winston, both of Brooklyn, N. Y.

Application June 10, 1938, Serial No. 212,940

4 Claims. (Cl. 10—102)

This invention relates to cutting screw threads on a cylindrical body, such as a bar or rod, and it is the object of the invention to provide improved means for cutting screw threads.

Heretofore it has been the practice in cutting screw threads on a cylindrical body to effect the cutting of the thread by means of a die supported in fixed position and rotating the work relative to the die, or to support the work in fixed position and rotate the die relative thereto, or the work is rotatably supported and the thread cut thereon by a tool having a single cutting face and it is an object of the invention to provide improved means to support a threading tool to independently and freely rotate and adapted to move the cutter into engagement with the work, and the work by the rotation and rolling engagement thereof with the cutter cause the cutter to rotate and bring successive cutting teeth into cutting engagement with the work.

It is a further object of the invention to provide a cutter having a cylindrical body with cutting teeth spaced about the periphery thereof and arranged to extend in the direction of the axis of the body and conforming to the pitch of the screw thread to be cut, and means to support the cutter to rotate on an axis extending transversely of the work and operative to bring the cutter into cutting engagement with the work and the cutter adapted to be rotated from the rotation of the work to cause successive cutting teeth of the cutter to be brought progressively into engagement with the work and have movement longitudinally of the work.

In the drawing accompanying and forming a part of this application,

Figure 1 is a plan view of a portion of a bench lathe showing an embodiment of my improved thread cutting means applied thereto.

Figure 2 is a sectional view taken on the line 2—2 of Figure 1 looking in the direction of the arrows.

Figure 3 is a detail view in plan showing the holder for the cutter positioned with the cutter in cutting engagement with the work; and Figure 4 is a detail view in section to show the mounting of the holder for the cutter and the mounting of the cutter in the holder.

An embodiment of the invention is shown in connection with a bench lathe of conventional form including a bed B, with a head stock mounted on one end thereof rotatably carrying an arbor 6 having a stepped pulley 7 fixed thereon and carrying a work supporting chuck 8, and a tail stock 9 mounted on the opposite end of the bed carrying a work engaging and supporting centering spindle 10.

A slide 11 is slidably mounted, as at 12, on a member 13 of a rest for the slide, to have movement parallelly or longitudinally of the work supporting chuck and centering spindle. The member 13 has a downwardly extending portion 14 whereby it is mounted to have rotative movement in a correspondingly formed circular recess in a member 15 slidably mounted to have movement transversely of the work supporting means on a support 16 slidably mounted on ways 17 of the bed B to have adjustment longitudinally of the bed. The slide 11 is adjusted in a direction longitudinally of the work supporting means by a crank 18 fixed to the end of a feed screw 19 having threaded connection with the slide, and the slide rest is adjusted in a direction transversely of the work supporting means by a crank 20 fixed to a feed screw 21 having threaded connection with the member 13 of the slide rest similar to the connection of the feed screw 19 with the slide. It will be obvious that by rotating the crank 18 in one direction the slide rest will be moved in one direction longitudinally of the work supporting means and that when it is rotated in the opposite direction the slide will be moved in the opposite direction longitudinally of the work supporting means. Also that by rotating the crank 20 the slide rest with the slide will be moved in one direction transversely of the work supporting means and when rotated in the opposite direction will move the slide in opposite direction. If desired the slide adjusting screw 19 may be supported by the bed B and operatively connected to suitable driving means or the arbor 6, to rotate the same and cause the slide to be moved longitudinally of the work supporting means and proportional to the rotation of the arbor and the work.

A cutter comprising a circular or annular body 22 having cutting teeth 23 equidistantly spaced about the periphery and extending in the direction of the axis of the bed with the cutting edges at the ends thereof, and which teeth may be arranged to conform to the pitch and lead of the screw thread to be cut, is engaged upon the end of a spindle 24 in abutting relation to an annular flange or shoulder 25 on the spindle and secured thereon by a nut 26 with an interposed washer. The cutter is fixed to the spindle to rotate therewith by a key fixed in the spindle engaging in a key-way in the cutter, as at 27. The spindle is rotatably mounted in an offset end portion of a holder 28 by means of an anti-friction radial and end thrust bearing 29, and secured therein by lock nuts 30. The holder 28 is supported and secured in a yoke portion 31 of a post and clamped therein by a screw 32, as shown in Figure 4. The post is arranged with a head at one end having a reduced portion at the connection thereof with the post, as at 33, whereby the post is slidably mounted in a T-slot 34 in the slide 11. The holder 28 is mounted in the post to extend laterally of the slide and the cutter to rotate on an axis extending transversely of the axis of the work W with the top of the body of the cutter in a plane coincident with or slightly below the center of the work. The work, shown in the form of a bar or rod, is fixedly carried or mounted at one end in the chuck 8 and supported at the opposite end by the spindle 10.

The chuck carrying arbor with the work W is rotated in a direction indicated by the arrow from a suitable source of power by a belt 35 passing around a stepped pulley 7. As the work is rotated the cutting teeth of the cutter are brought into operative cutting engagement with the work by rotating the crank 21 to cause the slide rest with the slide and cutter to move toward the work. As stated, the cutting teeth are arranged to conform to the pitch and lead of the thread to be cut, or the teeth may extend substantially parallelly to the axis of the cutter and the holder 28 set whereby the cutter will rotate on an axis substantially coincident with the pitch and lead of the thread to be cut. As the cutting teeth effect cutting of the thread the cutter will be rotated from the rotation of the work and cause successive cutting teeth of the cutter to be progressively brought into cutting relation to the work, as shown at 36 in Figure 3, and to effect progressive cutting of the thread the cutter with the holder supporting slide is moved longitudinally of the work to the right, as viewed in Figure 1, by the rotation of the crank 18, which is provided with circularly arranged graduations which are moved by the rotation of the crank relative to and in register with an index point on a tubular part in which the feed screw 19 is rotatable to indicate the extent of such adjustment of the cutter.

Having described my invention I claim:

1. In apparatus for cutting screw threads, a bed, a rotatable work support mounted on the bed, a cutter including an annular body having cutting teeth spaced about the periphery and extending in the direction of the axis thereof, a holder, means to rotatably mount the cutter on the holder, a slide rest mounted on the bed to have adjustment transversely of the work support, a slide upon which the cutter carrying holder is mounted to extend laterally therefrom and the cutter to rotate on an axis extending transversely of the work, and said slide mounted on the slide rest to have adjustment therewith and independently of the slide rest parallelly of the work support and adapted to be adjusted with the slide rest to engage the cutter with the work and the slide with the cutter in said position adjustable on the rest longitudinally of the work, and said cutter by engagement of the cutting teeth thereof with the work adapted to be rotated from the rotation of the work and cause successive teeth of the cutter to be progressively brought into cutting engagement with the work.

2. Apparatus for cutting screw threads as claimed in claim 1, wherein the means to rotatably mount the cutter upon the holder comprises a spindle upon which the cutter is fixed and an antifriction bearing carried by the holder in which the spindle is mounted to rotate and adapted to take up axial thrust transmitted by the work through the cutter to the spindle.

3. In apparatus for cutting screw threads, means to support a cylindrical work piece to rotate about its axis, a cutter including an annular body having cutting teeth spaced about the periphery and extending in the direction of the axis thereof, a spindle upon which said cutter is fixed, a holder, an anti-friction bearing for mounting the cutter carrying spindle to independently and freely rotate on the holder and adapted to take up axial thrust transmitted to the cutter, and adjustable means upon which the holder is mounted to support the cutter carrying spindle to rotate on an axis extending transversely of the work piece and with the ends of the cutting teeth to revolve in a plane substantially coincident with the axis of the work piece and adjustable to move the cutter into operative engagement with and longitudinally of the work piece, and said work piece by the rotation and rolling engagement thereof with the cutting teeth of the cutter and adjustment of the cutter with the adjustable means longitudinally of the work piece adapted to impart rotative movement to the cutter and cause successive cutting teeth thereof to be brought into cutting engagement with the work piece and effect progressive cutting of the thread.

4. In apparatus for cutting screw threads, means to support and rotate a cylindrical work piece about its axis, a cutter including a circular body having cutting teeth spaced about the periphery and extending in the direction of the axis thereof and conforming to the pitch of the thread to be cut, means adjustable toward and away from and parallelly of the work, and means to mount the cutter on said adjustable means to rotate independently and freely about its axis with an end of the cutter revolving in a plane substantially coincident with the axis of the work piece and take up axial thrust transmitted to the cutter by the work piece, and the rotation and rolling engagement of the work piece with the cutting teeth of the cutter and adjustment of the cutter with the adjustable means parallelly of the work adapted to rotate and cause successive cutting teeth of the cutter to be brought progressively into working engagement with the work piece and effect cutting of the thread.

LOUIS G. LARSEN.